[11] 3,600,568

| [72] | Inventor | Ad... |
| | | Aalen, Germany |
| [21] | Appl. No. | 27,753 |
| [22] | Filed | Apr. 13, 1970 |
| [45] | Patented | Aug. 17, 1971 |
| [73] | Assignee | Carl Zeiss-Stiftung doing business as, Carl Zeiss |
| | | Wurttemberg, Germany |
| [32] | Priority | Apr. 12, 1969 |
| [33] | | Germany |
| [31] | | P 19 18 612.0 |

[54] LIGHTING ARRANGEMENT
5 Claims, 9 Drawing Figs.

[52] U.S. Cl. .................................................. 240/1 EL,
350/96 B, 352/203, 353/102
[51] Int. Cl. ........................................................ F21
[50] Field of Search ........................................... 240/1, 1 EI;
350/96 B, 87; 352/203; 353/102

[56] References Cited
UNITED STATES PATENTS

| 1,351,562 | 8/1920 | Foster | 240/1 |
| 2,186,619 | 1/1940 | Sauer | 350/87 UX |
| 2,827,825 | 3/1958 | White | 240/1 X |
| 3,318,184 | 5/1967 | Jackson | 353/102 |
| 3,347,133 | 10/1967 | Moble | 240/1 |
| 3,497,701 | 2/1970 | Dalton | 350/96 X |

*Primary Examiner*—Louis J. Capozi
*Attorney*—Sandoe, Hopgood & Calimafde

ABSTRACT: An illuminating device for projecting light from a source into the object plane of an object to be illuminated, or into the plane of an incidence aperture of a measuring microscope or other observation instrument, includes: an optical fiber light conductor, a first lens arranged to project an image of the light source, a second lens to project the latter image onto the incidence surface of the conductor, and third lens means arranged for focusing light emerging from the light emergence surface of the conductor into an object plane, or into the plane of an incidence aperture of an observation instrument.

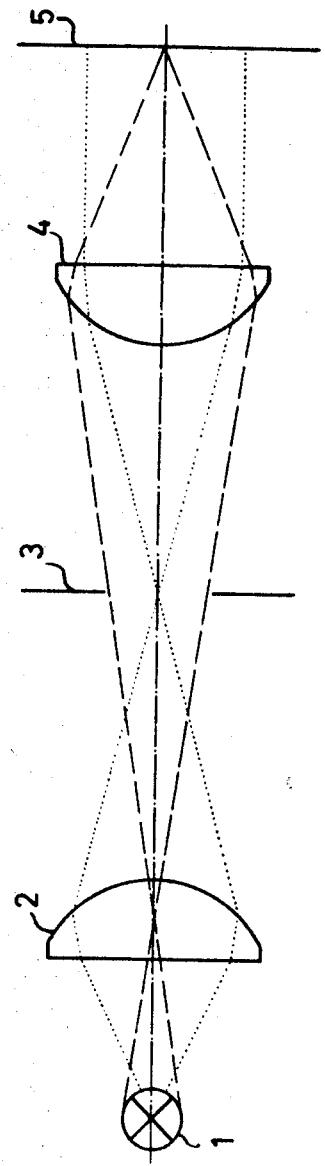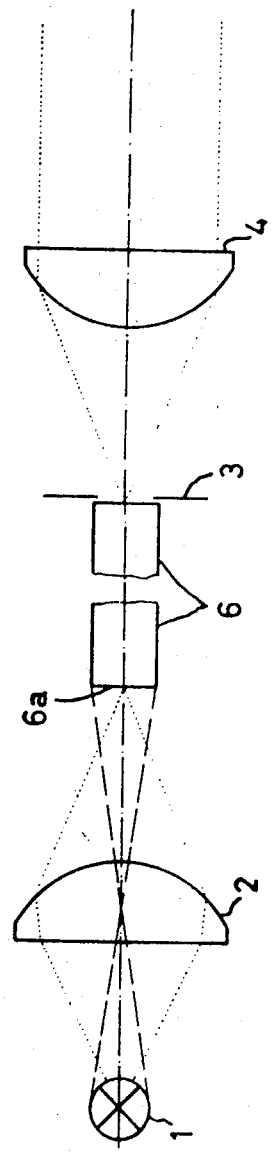

LIGHTING ARRANGEMENT

The present invention is an illuminating device, incorporating an optical fiber light conductor, for projecting light from a source into a plane, such as the object plane of an object to be illuminated, or into the incidence aperture of an observation instrument of system. In the case of an observation instrument having a telecentric lens the light projected into the incidence aperture would in effect be projected into infinity.

The device is particularly adapted for use with measuring microscopes.

Illuminating devices—for measuring microscopes, for example—constructed in accordance with the Köhler illumination principle are known. In the known devices light from a source is projected by a collector lens through an aperture to a condenser lens which projects the light from the aperture into an object plane or into the incidence aperture of an observation instrument. The aperture defines a field for the light passing through the central portion of the collector and this field of light through the aperture is projected into the object plane or incidence aperture in sharp definition.

It is also known to incorporate an optical fiber light conductor in such devices as means for spacing the light source from heat-sensitive parts of the device. In a known illuminating device of this kind light from the light source is projected onto the incidence surface of the light conductor by a collector lens. A field aperture is arranged at the light emergence end of the light conductor and light passing through the aperture is projected by a condenser lens into the incidence aperture of an observation instrument. With this device, however, the projection of the light from the field aperture to the incidence aperture is not sharply defined.

Devices of the foregoing type also have other disadvantages. For example the structure of the light source, such as the spiral filament of a light bulb, causes uneven illumination at the incidence surface of the light conductor and this uneven illumination is reproduced at the light emergence surface. When the light conductor is made up of a bundle of disoriented optical fibers, the image of the light source structure is not carried through the conductor, but the unevenness of illumination at the incidence end of each fiber is carried through.

Another disadvantage is that the beam of light from the light source is usually rectangular in cross section while the incidence end of the light conductor is usually round so that only an inner circle of the light is utilized, so that a portion of the available light is wasted.

Still another disadvantage of such illuminating devices is that they require a considerable amount of adjusting since they are quite sensitive to any dislocation of the light source.

Principal objects of the present invention are to provide an illuminating device which incorporates an optical fiber light conductor, but which provides more efficient and more effective use of light from the light source and which otherwise avoids the foregoing disadvantages of known devices.

In accordance with the invention an illuminating device which achieves these objects includes an optical fiber light conductor, a lens which projects an image of the light source, another lens to project the latter image onto the incidence surface of the conductor, and a lens or lenses to focus the light emerging from the light conductor into the plane of an incidence aperture of an observation instrument, or into the plane of an object to be illuminated.

The invention will now be described in detail with reference to the accompanying drawings in which:

FIG. 1 is a schematic illustration of a conventional form of illuminating device based on the Köhler illuminating principle;

FIG. 2 is a schematic illustration of a known type of illuminating device incorporating an optical fiber conductor;

Figure 3A:
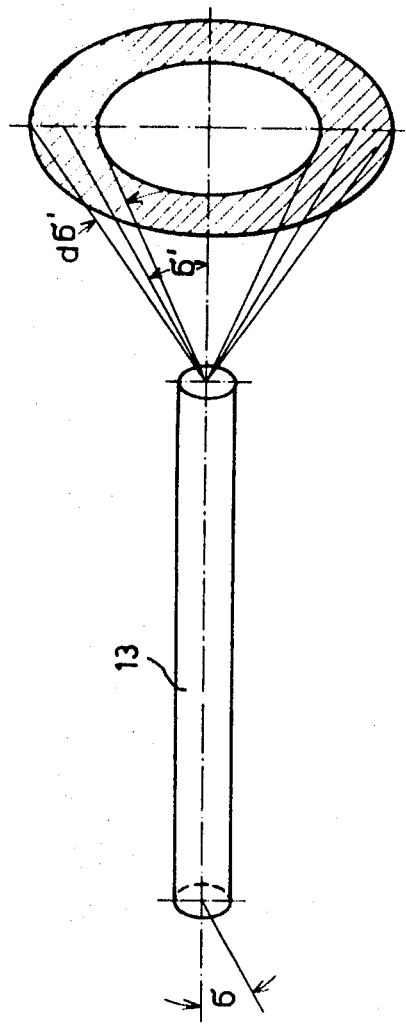
FIG. 3a is a diagrammatic illustration of the angular transfer property of an optical fiber light conductor.

Referring to the drawings FIGS. 1 and 2 illustrate the background of the invention with reference to prior art devices.

In the devices of FIG. 1 an image of the light source 1 is projected by a collector lens 2 into the aperture of an apertured diaphragm 3, and a condenser lens 4 focuses the image boundary of the lens 2 into an object plane 5.

In a known device illustrated in FIG. 2 the device of FIG. 1 is adapted to incorporate an optical fiber light conductor 6. As shown the collector lens 2 is arranged to project an image of light source 1 onto the incident surface 6a of light conductor 6. The apertured diaphragm 3 is arranged at the light emergence end of the conductor 6 and an image of the aperture is projected by condenser lens 4 into an incidence aperture of an observation instrument.

Before proceeding with a detailed description of the device of this invention it should be noted that the illuminating device of the invention makes use of particular observed transfer properties of optical fiber light conductors. The most pertinent properties, which are illustrated in FIGS. 4 to 8, are the manner of transfer of nonhomogenous light and the property of angular transfer.

If the illumination of the light incidence surface of the conductor is not homogenous, the inhomogeneity carries through to the emergence surface. If the fibers of the conductor are not oriented, the inhomogeneity is reduced if the diameter of the surface of the conductor is large relative to the diameters of the individual fibers since the inhomogeneity is averaged over the conductor surface. But, with respect to the diameter of an individual fiber, the inhomogeneity produced therein is fully retained.

As for angular transfer, if light enters the incidence end of the conductor in an axial direction, it emerges in an axial direction. If it enters at an angle, however, the angle at which it emerges is greater, the amount of the increase being depended upon the diameters of the individual fibers, the quality of the polish of the light incidence and light emergence surfaces, and upon inhomogeneities outside the individual fiber.

If parallel light rays enter the incidence end of the conductor at a given angle, they emerge from the other end in the form of a cone. The direction of the angle of the opening of the cone is the same as the angular direction in which the rays entered the conductor, but the angle of the cone opening is larger, the angle of the cone opening being a function of the entry angle of the rays. As illustrated in FIG. 3a light rays entering an optical fiber conductor 13 at an angle sigma emerge in angle range $d$ sigma' which is a function of angle sigma and angle sigma'.

Figure 3B:
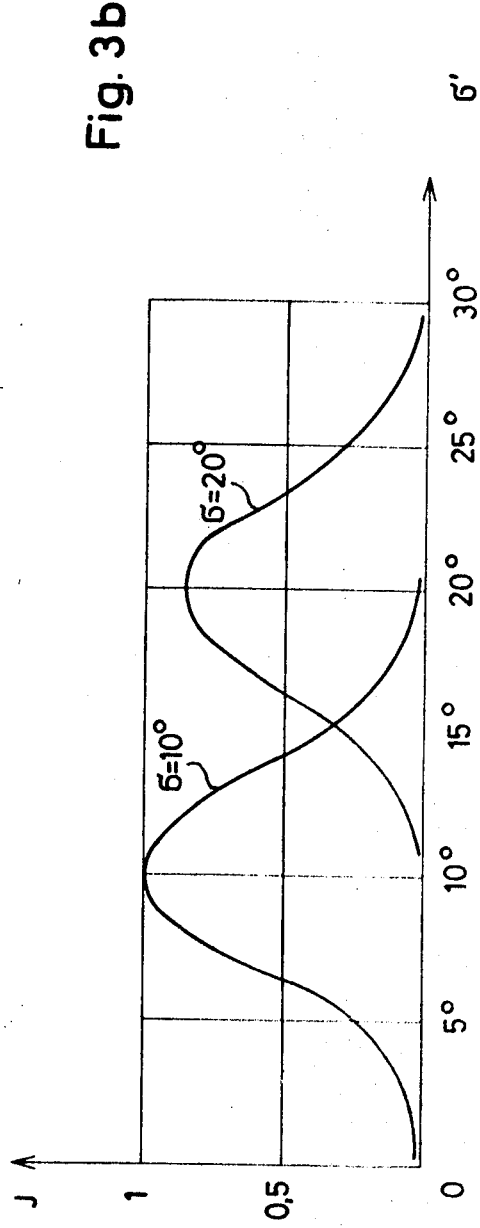
FIG. 3b is a graph of the wave forms of light rays entering an optical fiber conductor at two different angles, illustrating the increased angles at which the respective light rays emerge from the conductor.

FIG. 3b illustrates in graph form the increase in the angle at which light rays emerge from a conductor, for two rays entering respectively at a sigma angle of 10° and a sigma angle of 20°. The vertical axis represents the effective amplitude of the light waves passing through the conductor and the horizontal axis represents the angle of emergence sigma'. As indicated the ray entering at a 10° angle emerges at an angle slightly more than 20° and the ray entering at a 20° angle emerges approximately at 30° angle.

Figure 4:
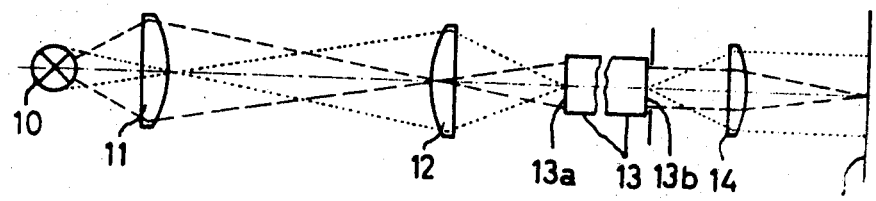
FIG. 4 is a schematic diagram of an illuminating device embodying the invention.

Referring now to FIG. 4, in an illuminating device in accordance with this invention, an image of light source 10 is projected by a planoconvex lens 11 into another planoconvex lens 12 which in turn projects the image from lens 11 into the incidence surface 13a of optical fiber light conductor 13. Another planoconvex lens 14 is arranged beyond the emergence surface 13b of conductor 13. The image side focal plane 15 of the lens 14 lies in the object plane 16. As indicated the lens 14 projects an image of the surface 13b to infinity, suitably for projecting the image into the incidence aperture of an observation instrument, such as a measuring microscope (not shown).

In the embodiment illustrated in FIG. 4 (and also in the embodiment illustrated in FIGS. 5 and 7) the planoconvex lenses 11 and 12 are arranged so that image of light source 10 is in focus at the focal center of the lens 12.

Figure 5:
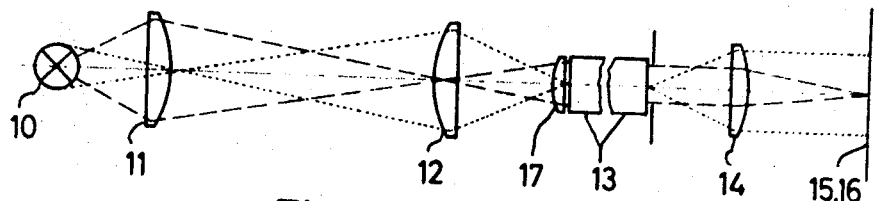
FIGS. 5, 6, 7 and 8 are schematic diagrams respectively showing modification of the device illustrated in FIG. 4.

Referring to FIG. 5, since the conductor 13 is telecentric as to rays entering it axially—which means that the main rays of each light beam passing through each fiber are perpendicular to the light incidence or light emergence surfaces—it is expedient to make use of this fact to enhance the efficiency of the light transfer by placing a planoconvex lens 17 at the light incidence end of the conductor 13 and arranging the lens 17 with its object side focal point coinciding with the optical center of lens 12.

Figure 7:
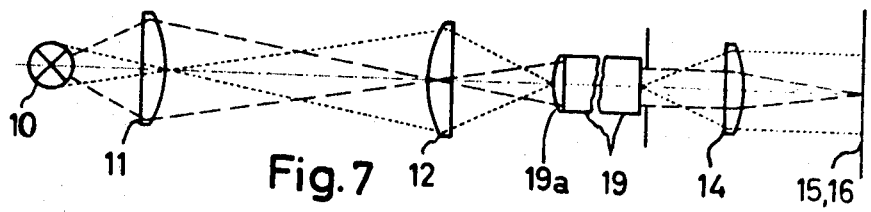

The effect produced by the addition of lens 17 in the FIG. 5 embodiment can also be produced in the manner illustrated in FIG. 7, by providing an optical fiber conductor 19 which has a convex incidence surface 19a. In this instance the convex surface 19a would be formed so that its focal point coincides with the optical center of the lens 12.

Figure 6:
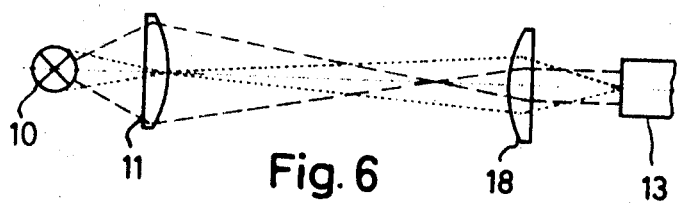

FIG. 6 illustrates an embodiment in which a second-in-line planoconvex lens 18—which is used in place of the planoconvex lens 12 in the FIG. 4, 5 and 7 embodiments—is positioned with its object side focal plane in the object side focal plane of the first-in-line lens 11, so that the light rays projected from the lens 18 are perpendicular to the incidence end of conductor 13. This produces the same beneficial ray alignment produced by the lens 17 in FIG. 5 and the convex incidence surface 19a in FIG. 7.

Figure 8:
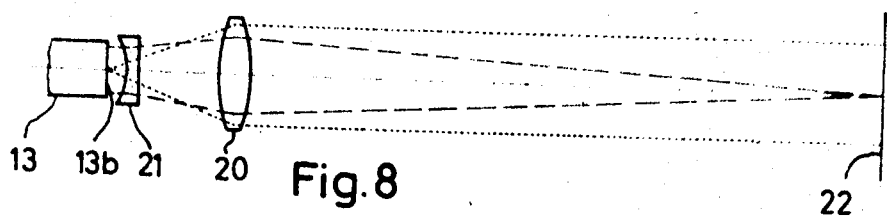

FIG. 8 illustrates another arrangement of lens for projecting an image from the emergence surface 13b onto an object field 22. In this embodiment a planoconvex lens 21 is arranged adjacent to the emergence surface 13b to cooperate with a double convex lens 20 so that the combination operates to focus the image from the conductor 13 at the object field 22.

What I claim is:

1. An illuminating device for projecting light into a plane, such as the object plane of an object to be illuminated and into the plane of an incidence aperture of an observation system, said device comprising a light source, an optical fiber light conductor having an incidence surface at one end and a light emergence surface at the other end, first lens means for projecting an image of the light source, second lens means arranged to project an image of the first lens onto said incidence surface, and third lens means for focusing light from said light emergence surface into said plane, the focal planes of said third lens means being in the planes of said emergence surface and of said object plane.

2. The device of claim 1 wherein said lens means is a lens positioned so that the image of the light source projected from the first lens means, which is a lens, is focused at the optical center of the second lens.

3. The device of claim 2 which includes a fourth lens positioned adjacent said incidence surface of the light conductor with its focal point at the optical center of the second lens.

4. The device of claim 2 in which said incidence surface of the light conductor is convex with the focal point defined by its convexity being at the optical center of the second lens.

5. The device of claim 1 wherein said first lens means is positioned with its focal point between the first and second lens means and the second is positioned with its focal point coinciding with the plane of the image of the light source projected by the first lens means.